(12) United States Patent
Reed (10) Patent No.: US 8,324,021 B2
(45) Date of Patent: *Dec. 4, 2012

(54) ADVANCED SMART CARDS WITH INTEGRATED ELECTRONICS IN BOTTOM LAYER AND METHOD OF MAKING SUCH ADVANCED SMART CARDS

(76) Inventor: Paul Reed, Shoreline, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/942,706

(22) Filed: Nov. 9, 2010

(65) Prior Publication Data

US 2011/0155809 A1    Jun. 30, 2011

Related U.S. Application Data

(63) Continuation of application No. 11/661,206, filed as application No. PCT/US2005/009649 on Mar. 23, 2005, now Pat. No. 8,012,809.

(51) Int. Cl.
*H01L 21/44* (2006.01)
*H01L 21/48* (2006.01)
*H01L 21/50* (2006.01)
*H05K 3/30* (2006.01)
*G06K 19/077* (2006.01)
*G06K 19/02* (2006.01)

(52) U.S. Cl. ............ 438/106; 29/841; 235/488
(58) Field of Classification Search .......... 438/106; 235/488; 29/841
See application file for complete search history.

(56) References Cited

U.S. PATENT DOCUMENTS

| | | |
|---|---|---|
| 1,311,749 A | 1/1982 | Hiraiwa et al. |
| 4,539,472 A | 9/1985 | Poetker et al. |
| 4,641,418 A | 2/1987 | Meddles |
| 4,792,843 A | 12/1988 | Haghiri-Tehrani et al. |
| 4,855,583 A | 8/1989 | Fraser et al. |
| 4,857,483 A | 8/1989 | Steffen et al. |
| 4,931,853 A | 6/1990 | Ohuchi et al. |
| 5,027,190 A | 6/1991 | Haghiri-Tehrani et al. |
| 5,067,008 A | 11/1991 | Yanaka et al. |
| 5,134,773 A | 8/1992 | LeMaire et al. |
| 5,164,144 A | 11/1992 | Rose |
| 5,272,374 A | 12/1993 | Kodai et al. |
| 5,311,396 A | 5/1994 | Steffen |
| 5,350,553 A | 9/1994 | Glaser et al. |
| 5,365,655 A | 11/1994 | Rose |
| 5,387,306 A | 2/1995 | Jarvis |
| 5,399,907 A | 3/1995 | Nguyen et al. |
| 5,416,358 A | 5/1995 | Ochi et al. |
| 5,417,905 A | 5/1995 | Lemaire et al. |

(Continued)

FOREIGN PATENT DOCUMENTS

EP    0 350 179    1/1990

(Continued)

OTHER PUBLICATIONS

English Abstract of WO 03/034333.

(Continued)

*Primary Examiner* — David S Blum (57) ABSTRACT

An advanced smart card with a top layer, a core layer of thermoset polymeric material, and a bottom layer comprising an integrated electronics assembly mounted on a substrate. The advanced smart card is formed by positioning a bottom layer in a bottom mold, placing a top layer in a top mold, closing the mold, injecting a thermosetting polymeric material to form a precursor advanced smart card, removing the precursor, and trimming the precursor to produce a finished smart card.

15 Claims, 11 Drawing Sheets

U.S. PATENT DOCUMENTS

| | | | |
|---|---|---|---|
| 5,468,910 | A | 11/1995 | Knapp et al. |
| 5,486,687 | A | 1/1996 | Le Roux |
| 5,498,388 | A | 3/1996 | Kodai et al. |
| 5,510,074 | A | 4/1996 | Rose |
| 5,598,032 | A | 1/1997 | Fidalgo |
| 5,822,190 | A | 10/1998 | Iwasaki |
| 5,894,006 | A | 4/1999 | Herbst |
| 5,898,215 | A | 4/1999 | Miller et al. |
| 5,955,021 | A | 9/1999 | Tiffany, III |
| 6,025,054 | A | 2/2000 | Tiffany, III |
| 6,031,724 | A | 2/2000 | Takahashi |
| 6,049,463 | A | 4/2000 | O'Malley et al. |
| 6,214,155 | B1 | 4/2001 | Leighton |
| 6,241,153 | B1 | 6/2001 | Tiffany, III |
| 6,256,873 | B1 | 7/2001 | Tiffany, III |
| 6,395,373 | B2 | 5/2002 | Conti et al. |
| 6,406,935 | B2 | 6/2002 | Kayanakis et al. |
| 6,468,835 | B1 | 10/2002 | Blanc et al. |
| 6,509,217 | B1 | 1/2003 | Reddy |
| 6,514,367 | B1 | 2/2003 | Leighton |
| 6,619,553 | B1 | 9/2003 | Bobrov et al. |
| 6,648,232 | B1 | 11/2003 | Emmert |
| 6,649,014 | B1 | 11/2003 | Wada |
| 6,851,618 | B2 | 2/2005 | Halope |
| 7,225,537 | B2 | 6/2007 | Reed |
| 2005/0025943 | A1 | 2/2005 | Krappe et al. |
| 2008/0282540 | A1 | 11/2008 | Singleton |

FOREIGN PATENT DOCUMENTS

| | | |
|---|---|---|
| EP | 0745956 | 12/1996 |
| GB | 2219960 A | 12/1989 |
| GB | 2227209 A | 7/1990 |
| JP | 03 001992 A | 1/1991 |
| WO | WO 03/034333 A1 | 4/2003 |

OTHER PUBLICATIONS

English Abstract of JP 03001992.

English Abstract of EP 0745956.

Figure 1: Finished Advanced Smart Card

Figure 3: After Cold, Low Pressure Forming

Figure 4: Semi-Finished Advanced Smart Card

Figure 5: Mold Design for ISO Cards

Figure 6: Contacted Advanced Smart Card

Figure 7: Contactless Advanced Smart Card

Figure 8: Dual Interface Advanced Smart Card

Figure 10: Chemosensitive Advanced Smart Card

Figure 11: Contactless Advanced Smart Card with Acoustic Speaker

US 8,324,021 B2

ADVANCED SMART CARDS WITH INTEGRATED ELECTRONICS IN BOTTOM LAYER AND METHOD OF MAKING SUCH ADVANCED SMART CARDS

This application is a continuation of application Ser. No. 11/661,206, now U.S. Pat. No. 8,012,809, filed Feb. 23, 2007, which is the U.S. National Phase of, and claims priority to PCT/US2005/09649, filed Mar. 23, 2005.

BACKGROUND OF THE INVENTION

The present invention relates generally to advanced smart cards that may contain batteries, LEDs, LCDs, polymer dome switches, fingerprint sensors, and other electronic components that are not found in conventional smart cards. A conventional smart card is the size of a traditional credit card, and they usually contain an Integrated Circuit (IC) chip and may contain an antenna if the card must transfer data using Radio Frequency (RF) transmission. Advanced smart cards may include components that are not found in conventional smart cards, such as batteries, displays, and keypads. Advanced smart cards may therefore be capable of many sophisticated functions, such as displaying data, enabling users to enter Personal Identification Numbers (PIN) and passwords, and detecting security threats.

Smart cards are being widely utilized for access control systems, storage of biometric data, national border control, and in many other applications. Smart cards typically contain information about a user. For example, the U.S. Department of Defense (DoD) Common Access Card (CAC) project requires a contactless chip to contain biometric data about a citizen including a digitized portrait and fingerprint data.

These advanced smart cards typically consist of a multi-layer structure having one or more plastic layers surrounding integrated circuits that store the data. Data is transferred to and from the cards through radio frequency (RF) transmission. Cards that transfer data only by RF transmission are so-called "contactless" cards. For RF transmission, contactless advanced smart cards include an antenna for transmitting data to and from the integrated circuits. With increasing security concerns in the post-September 11 environment, contactless RFID chips are being incorporated into documents like passports and other document or note formats.

Several problems exist with prior art smart card arrangements in that PVC is utilized for its rigidity in order to protect the antenna and integrated circuit from breaking upon flexure. Each layer of PVC must be of a prescribed thickness to surround and protect the components. In order to maintain the rigidity required and house the components necessary, these PVC cards tend to be relatively thick as compared to other types of cards such as a credit card. Generally, such resulting multi-layer structures are approximately 0.060 inches thick. Additionally, PVC tends to become brittle with age and exposure to ultraviolet rays. This contributes to card failure in time. Additionally, specialized printing equipment is required to print information on the outer surfaces of the PVC material.

Many other problems frequently occur with the very high temperatures and pressures required for hot lamination including damage to fragile Integrated Circuit (IC) chips, antenna (often thin wire coils, thinly etched copper, or thinly deposited silver), and other electronic components. The very high heat levels, typically about 300° F., and the very high pressures, typically ranging from 1,000 to 30,000 PSI or greater, used in the plastic card lamination production process are the cause of severe thermal and physical stress on smart card components.

What is needed is an improved method for producing an Advanced Smart Card (containing Integrated Circuits, antennae, batteries, polymer dome switches, Liquid Crystal Displays, Light Emitting Diode arrays, fingerprint sensors), that allows sensitive components to be securely and reliably incorporated into a very thin and flexible card structure, and that utilizes low heat (e.g. less than 150° F.) and low pressure (e.g. less than 100 PSI).

A new generation of highly sophisticated smart cards has become technically feasible due to advances in materials science and electronics. Miniature batteries, data displays, keypads, and even fingerprint sensors have been developed that may be incorporated into a smart card sized form factor. These advances are stimulating new smart card capabilities and applications. For example, a smart card equipped with a battery, data display, and keypad would enable users to view data regarding: 1) the current balance of electronic purse applications, 2) recent credit card transaction information, or 3) bank account balance information. These capabilities could also be utilized to enhance security with password-enabled credit card functions. While these expanded smart card capabilities offer tremendous potential for new applications, large scale production of advanced cards with lamination-based manufacturing techniques is extremely difficult due to the electronic component damage caused by the high heat and pressure used in lamination. A new card production process utilizing low heat and pressure is needed to enable delicate electronic components to be effectively incorporated within card bodies.

SUMMARY OF THE INVENTION

It is therefore an object of this invention to provide an Advanced Smart Card with a thickness not greater than 0.80 mm (the thickness of a conventional credit card) that contains securely encapsulated Advanced Smart Card electronics that may include: Integrated Circuits, antennae, batteries, polymer dome switches, Liquid Crystal Displays, Light Emitting Diode arrays, fingerprint sensors.

This and other objects are achieved by providing a multi-layer card structure with a top layer of material such as synthetic paper, PVC, PC, or other suitable material, a bottom layer that is comprised of an integrated electronics assembly (that may include Integrated Circuits, antennae, batteries, polymer dome switches, Liquid Crystal Displays, Light Emitting Diode arrays, and fingerprint sensors), with a core layer of injected polymeric material that securely encapsulates the electronic components that make up the bottom layer, and securely bonds to the top layer of synthetic paper or other suitable material.

The void space between the top layer and the bottom layer facilitates an even flow and a complete encapsulation of the electronic components by injected polymeric material. The void space of approximately 0.1 to 0.25 mm allows injected polymer to fill the void space and cover the electronic components and the bottom surface of the top layer, with no voids, pockets and with an even and complete distribution of the polymeric material in the void space.

The integrated electronics assembly that makes up the bottom layer is produced on a single continuous sheet, which is then cut by a machine tool in a form that allows the Advanced Smart Card perimeter to be covered by the injected polymer.

DETAILED DESCRIPTION OF THE INVENTION

Figure 1:
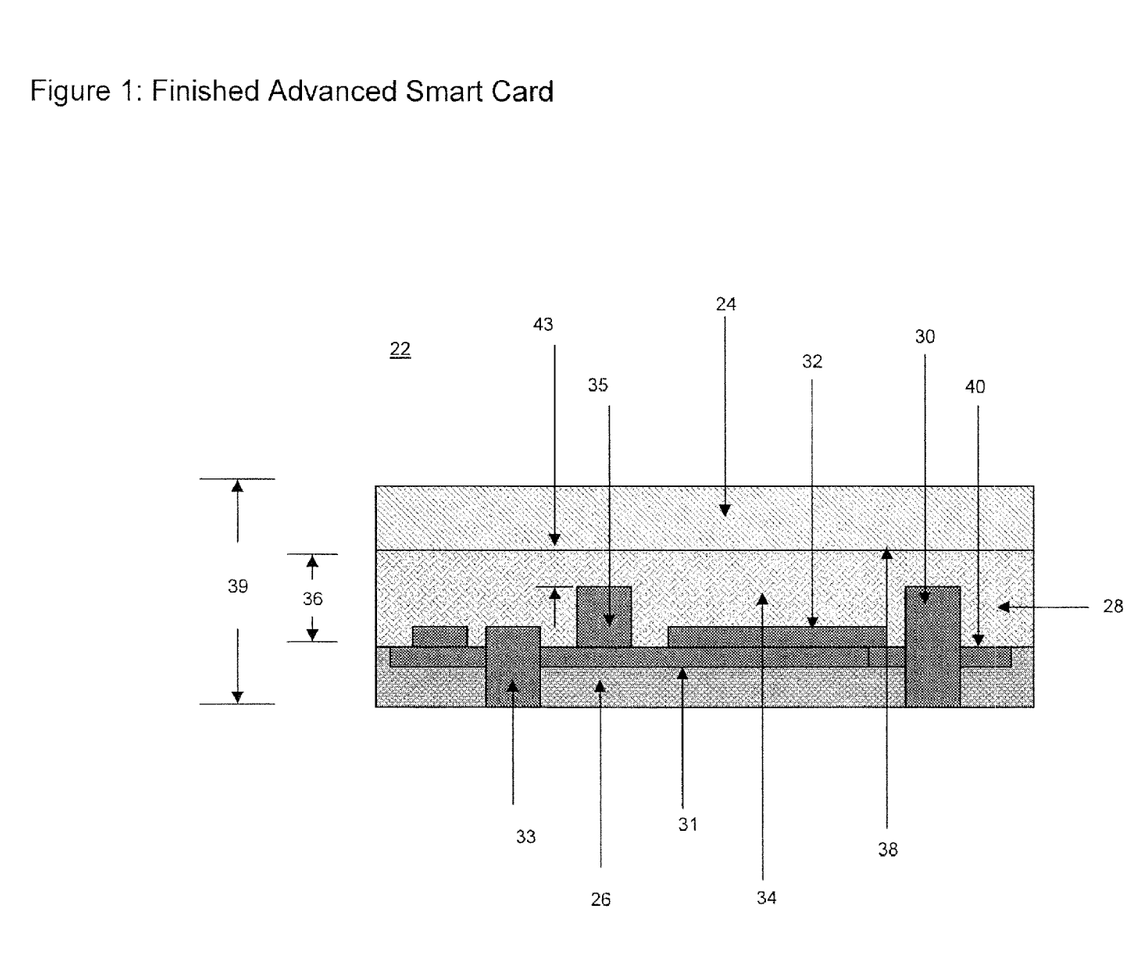
FIG. 1 is a cut-away side view of an Advanced Smart Card made according to the teachings of this patent disclosure.

FIG. 1 depicts a cut-away side view of an Advanced Smart Card 22 made according to the teachings of this patent disclosure. In its finished form, such an Advanced Smart Card will be comprised of a top layer 24, a bottom layer 26, and a center or core layer 28. The top layer 24 is a film or sheet of synthetic, PVC, Polycarbonate, or other suitable material. The bottom layer 26 is an electronics assembly on a substrate circuit board (e.g. polyimide for flexible printed circuits or industry standard FR4 for conventional printed circuit boards) containing a number of integrated electronic components such as a Light Emitting Diode (LED) 30, a battery 32, a polymer dome switch 33, a microprocessor 35, an antenna 31, a Liquid Crystal Display (not shown). The center or core layer consists of a thermosetting polymeric material 34 (e.g., an initially liquid or semi-liquid thermosetting resin) that, upon curing, constitutes the center or core layer 28 of a finished Advanced Smart Card. The center or core layer 28 completely encapsulates all exposed electronic components on the top surface of the bottom layer 26. The thermosetting material 34 that eventually becomes the center layer 28 of the Advanced Smart Card is injected into the void space 36 between the top layer 24 and bottom layer 26. This injected polymeric material 34 should be capable of being injected under the relatively cold, low pressure forming conditions employed in applicant's process.

In any case, such thermosetting polymeric materials will be injected into, and fill, the void space 36 defined between the inside surface 38 of the top layer 24 and the inside surface 40 of the bottom layer 26. Upon curing, the polymeric material 34 of the center layer 28 should bond or otherwise adhere to both the inside surface 38 of the top layer 24 and the inside surface 40 of the bottom layer 26 to produce a unified Advanced Smart Card body. Such adhesion can be aided by treating the inside surfaces 38 and 40 of the top and bottom layers, respectively, in any one of several ways. For example, bond promoting agents known to this art (e.g. chloro-polyolefins) may be employed to enhance bonding between the core layer-forming thermoset material and the material(s) from which the top and bottom layers are made (e.g., PVC, polyimide). By way of example only, Minnesota Mining and Manufacturing's base primer product 4475® can be used for this bond enhancing purpose, especially when the top or bottom layer material is PVC. Other treatments that can be applied to the inside surfaces of the top and/or bottom layers include plasma corona treatments and acid etching.

The Advanced Smart Card's thickness 39 is defined by placement of the mold faces (not shown in FIG. 1) as the thermoset material is injected into the void space 36 as part of the cold, low pressure forming process of this patent disclosure. In effect, the injection of the thermoset material into the void space 36 between the top and bottom layers fills any portion of that void space 36 that is not otherwise occupied by the electronic components protruding from the bottom layer 26.

Figure 2:
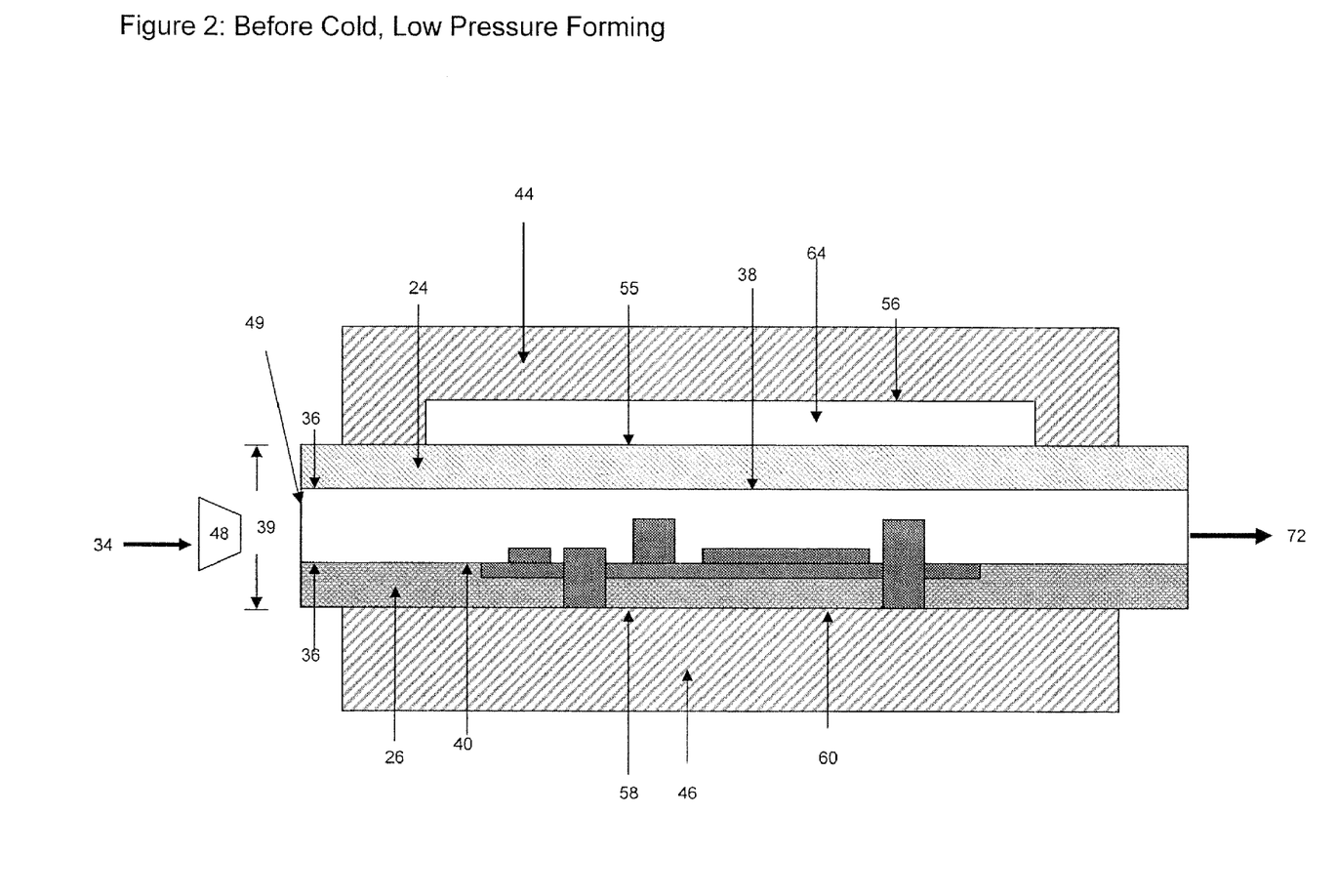
FIGS. 2 and 3 are cut-away side views of a mold tool set up for making a first preferred embodiment of an Advanced Smart Card of this patent disclosure wherein certain Advanced Smart Card components (e.g. Integrated Circuit chips and antenna coil) are shown before a liquid polymeric material is injected between the Advanced Smart Card's top and bottom layers (see FIG. 4 and after (see FIG. 5) the polymeric material is injected into a void space between the top and bottom layers and thereby filling said void space with a polymeric material and cold forming the top layer of the Advanced Smart Card to the contour of the top mold's document-forming cavity.

The layout of electronic components on the top surface of the bottom layer in the manner generally suggested in FIG. 2 allows the incoming liquid or semi-liquid polymeric material to flow over and around all sides of exposed electronic components.

The elastomeric properties of the cured thermoset polymer provide protection from physical and thermal stressors for the electronic components in the bottom layer. The shock-absorbing properties of the elastomer that encapsulates all exposed electronics enable the assembly to resist flexion and/or torsion and/or impact forces that the Advanced Smart Card may encounter upon either of its major outside surfaces or on any of its four outside edge surfaces. The thermal insulation properties of the elastomer also reduce the amount of heat to which the electronic components may be exposed during a final hot lamination process employing a thin layer of PVC to create a high quality exterior surface on the bottom surface of the bottom layer.

Figure 3:
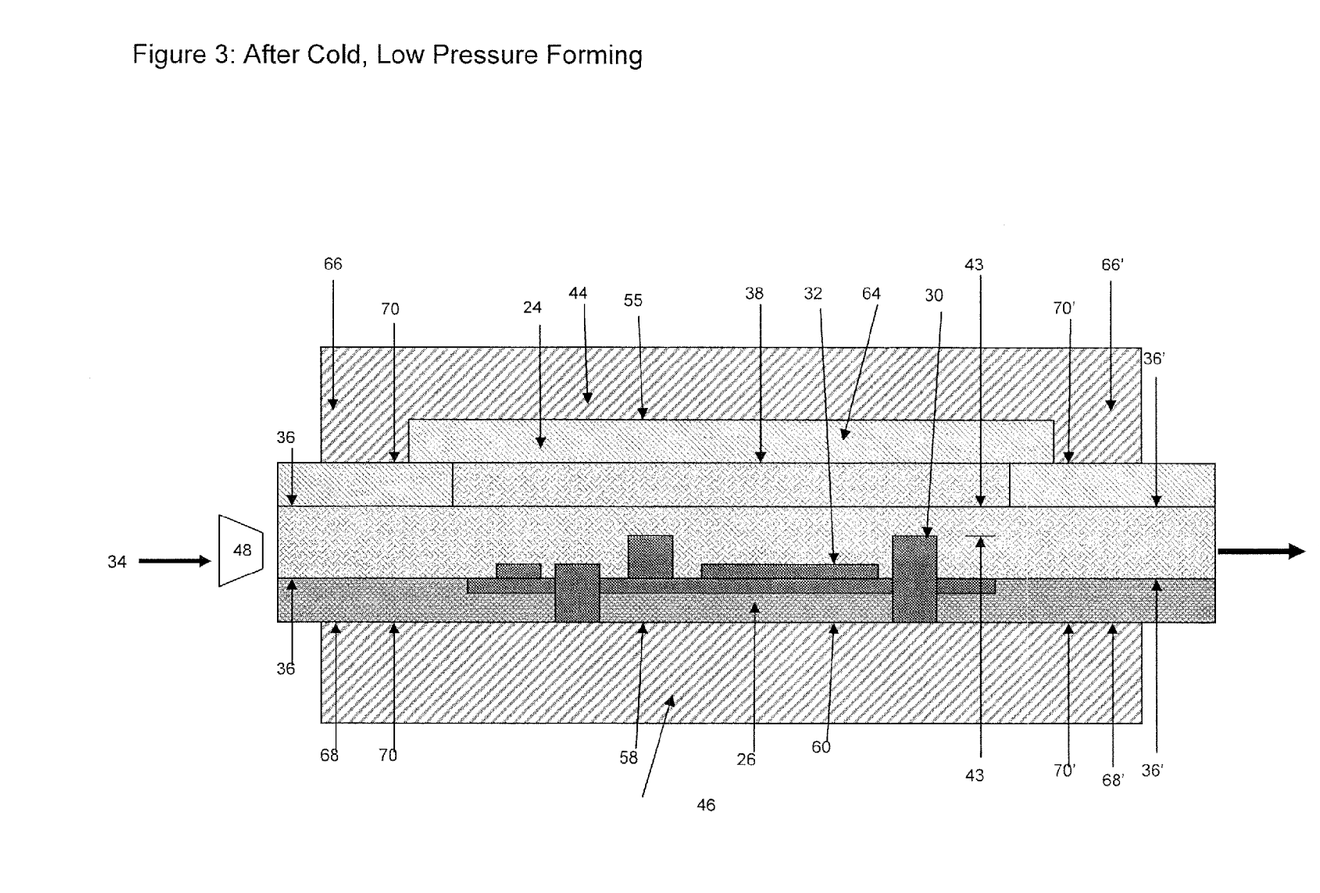

FIGS. 2 and 3 are contrasted to illustrate a first preferred embodiment of applicant's methods for making Advanced Smart Cards. That is to say that FIG. 2 depicts a particularly preferred embodiment of this invention wherein a flat, top layer or sheet 24 of synthetic paper or plastic material such as PVC is shown before it is cold, low pressure formed according to the teachings of this patent disclosure. In other words, FIG. 2 depicts the mold tool set-up just prior to the injection of the polymeric material and wherein a flat, top layer 24 (e.g., a flat sheet of PVC) is shown as it is initially placed under an Advanced Smart Card-forming cavity of the top mold 44 and a bottom layer 26 (e.g., an integrated electronics assembly on a substrate) is shown as it is placed over a bottom mold 46. Again, however, in some less-preferred, but still viable, embodiments of applicant's processes the top layer 24 may be pre-molded or at least partially pre-molded, preferably, to the general contour of the Advanced Smart Card-forming cavity 64 in the top mold. By way of comparison, the bottom mold 46 has no cavity comparable to the cavity in the top mold 44. A nozzle 48 for injecting a liquid or semi-liquid, thermoplastic or thermosetting polymeric material 34 is shown being inserted into an orifice 49 that leads to the void space 36 that is defined between the inside surface 38 of the top layer 24 and the inside surface 40 of the bottom layer 26. The distance between the top surface of the top layer and the bottom surface of the bottom layer of the Advanced Smart Card is depicted by distance 39. The void space 36 is shown extending from the left end to the right end of the juxtaposed top layer 24 and bottom layer 26. In other words, in FIG. 2 the outside surface 55 of the top layer 24 is not yet in contact with the inside surface 56 of the Advanced Smart Card-forming cavity 64 of the top mold 44. By way of contrast, the outside surface 58 of the bottom layer 26 is shown in substantially flat, abutting contact with the inside surface 60 of the bottom mold 46. FIG. 3 depicts the effects of injecting the thermoset polymeric material into the void space 36 between the top and bottom layers 24 and 26. Thus, FIG. 3 shows the top layer 24 after it has been molded into an Advanced Smart Card-forming cavity 64 in the top mold 44.

In both FIGS. 2 and 3 the electronic components contained in the bottom layer 26 of the Advanced Smart Card (e.g., the antenna 31, battery 32, IC chip 35) are shown as they may be positioned in the integrated electronics assembly comprising the bottom layer. This invention for producing Advanced Smart Cards is compatible and viable for a wide range of card designs that incorporate a variety of components and devices in the bottom layer. The detailed design of the electronic components in bottom layer 26 will depend on the specific application(s) for which the Advanced Smart Card is intended. These applications may include: access control for building entry, data display for bank cards or ATM cards, password entry for Identification Cards, and fingerprint verification (using a fingerprint sensor) for security-related applications.

For the purpose of this invention, the detailed design of the circuit and electronic components in bottom layer 26 is not critical except for the dimensional constraints that must be satisfied. For an ISO 7810-compliant Advanced Smart Card produced using this method, the electronic elements in the bottom layer must fit within a form factor of 81 mm (length) by 49 mm (width) and with a maximum height of 0.55 mm (including the bottom layer substrate). The distance 43 in FIG. 3 is about 0.15 mm and it represents the minimum clearance from the inside surface 38 of the top layer 24 and the top-most surface of the highest electronic component 30 mounted on the bottom layer 26. The minimum distance 43 is required to allow sufficient injected polymeric material to encapsulate the electronic components mounted on the bottom layer and to provide adequate shock-absorption and thermal insulation properties.

In FIG. 2 the top mold 44 is shown having a cavity 64, which defines the surface contour of the top of the Advanced Smart Card to be formed during the injection process. To this end, the injection of the liquid or semi-liquid thermoset polymeric material 34 should be under pressure and temperature conditions such that the top layer 24 is cold, low pressure, formed into the cavity 64 of the top mold 44. FIG. 3 shows how the cold, low pressure forming process of this patent disclosure has in fact conformed the top surface 55 of the top layer 24 to the configuration of the Advanced Smart Card-forming cavity 64 in the top mold 44. Again, the bottom surface 58 of the bottom layer 26 is shown in FIG. 3 molded against a substantially flat inside surface 60 of the bottom mold 46. This is a particularly preferred arrangement for making the Advanced Smart Cards of this patent disclosure.

In FIGS. 2 and 3 a front lip region 66 of the top mold 44 and a front lip region 68 of the bottom mold 46 are shown spaced apart from each other by a distance 70 that (taking into consideration the thickness of the top and bottom layers 24 and 26), in effect, defines the distance 36 (i.e., the width of the void space) between the top layer 24 and the bottom layer 26 at these lip regions of the two molds 44 and 46. This distance 70 should be such that the thermoset polymeric material 34 can be injected into the void space 36 over the entire length of the Advanced Smart Card (e.g., from its left side to its right side). The counterpart distance 70' of the mold device setting on the right side of the system shown in FIG. 2 may differ from that of its counterpart distance 70 on the left side. In any case the distance 70' should be such that the distance 36' defined between the inside surface 38 of the top layer 24 that passes through the rear lip 66' of the top mold 44 and the inside surface 40 of the bottom layer 26 that passes through the rear lip 68' of the bottom mold 46 is very small—but still finite. That is to say that this very small distance 36' should be large enough to allow gases 72 (e.g., air, polymeric ingredient reaction product gases, etc.) in the void space 36 that originally existed between the top and bottom layers 24 and 26 (see again, FIG. 2) and excess polymeric material to be exhausted from said void space 36, but still be small enough to hold the injection pressures used to inject the thermoset polymeric material. Indeed, the distance 36' is preferably sized large enough to allow even thin layers of the liquid polymeric material 34 itself to be "squirted" or "flashed" out of the void space 36—and thus allowing all gases residing in, or created in, the void space 36 to be expunged out of said void space and, indeed, out of the mold system itself. Thus, all such gases 72 are completely replaced by the incoming liquid thermoset material 34. This gas exhaust technique serves to prevent gas bubbles from forming in the body of the thermoset material 34 that eventually (i.e., upon curing of the thermoset material) comprises the center layer 28.

Figure 4:
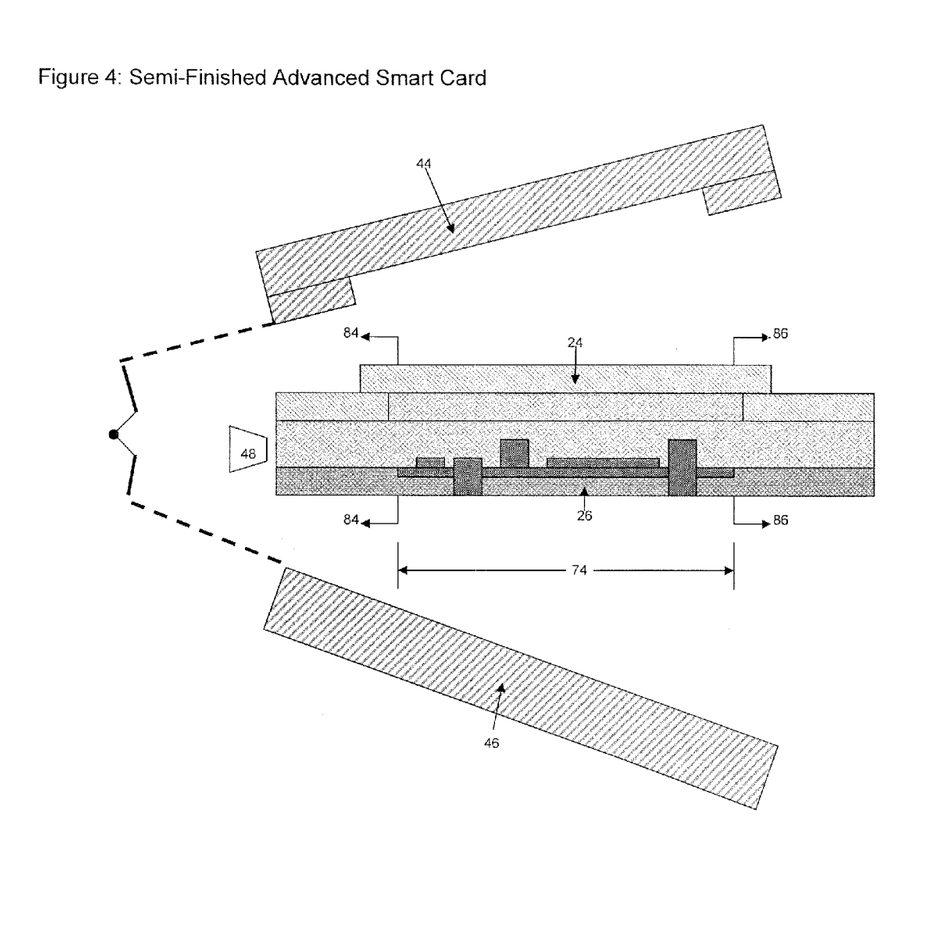
FIG. 4 is a cut-away view showing a mold tool being removed from a precursor Advanced Smart Card body formed by the system generally depicted in FIG. 3.

FIG. 4 shows a semi-finished or precursor Advanced Smart Card of the type shown in FIG. 3 being removed from a mold system. Section lines 84-84 and 86-86 respectively show how the left end and right end of the precursor Advanced Smart Card can be cut or trimmed away to create the sharp edges and precise dimensions of a finished Advanced Smart Card. In this case the distance 74 is about 85 millimeters to conform to ISO 7810 specifications for an Identification Card.

Figure 5:
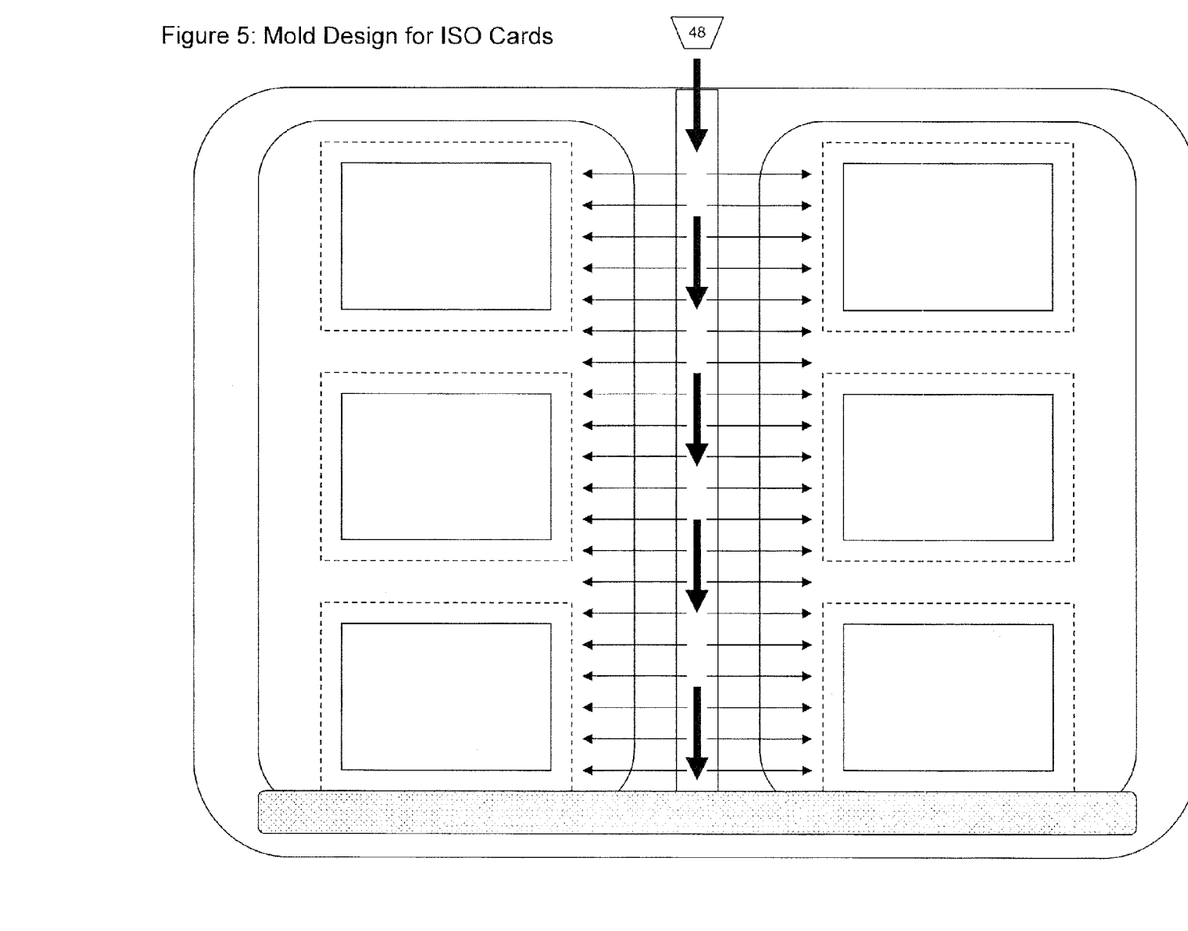
FIG. 5 depicts a mold tool system that is capable of making six Advanced Smart Cards (with dimensions of approximately 54 mm by 85 mm) simultaneously.

FIG. 5 illustrates a molding procedure being carried out according to some of the preferred embodiments of this patent disclosure wherein six Advanced Smart Cards with dimensions of approximately 85 mm by 54 mm are being molded simultaneously.

Figure 6:
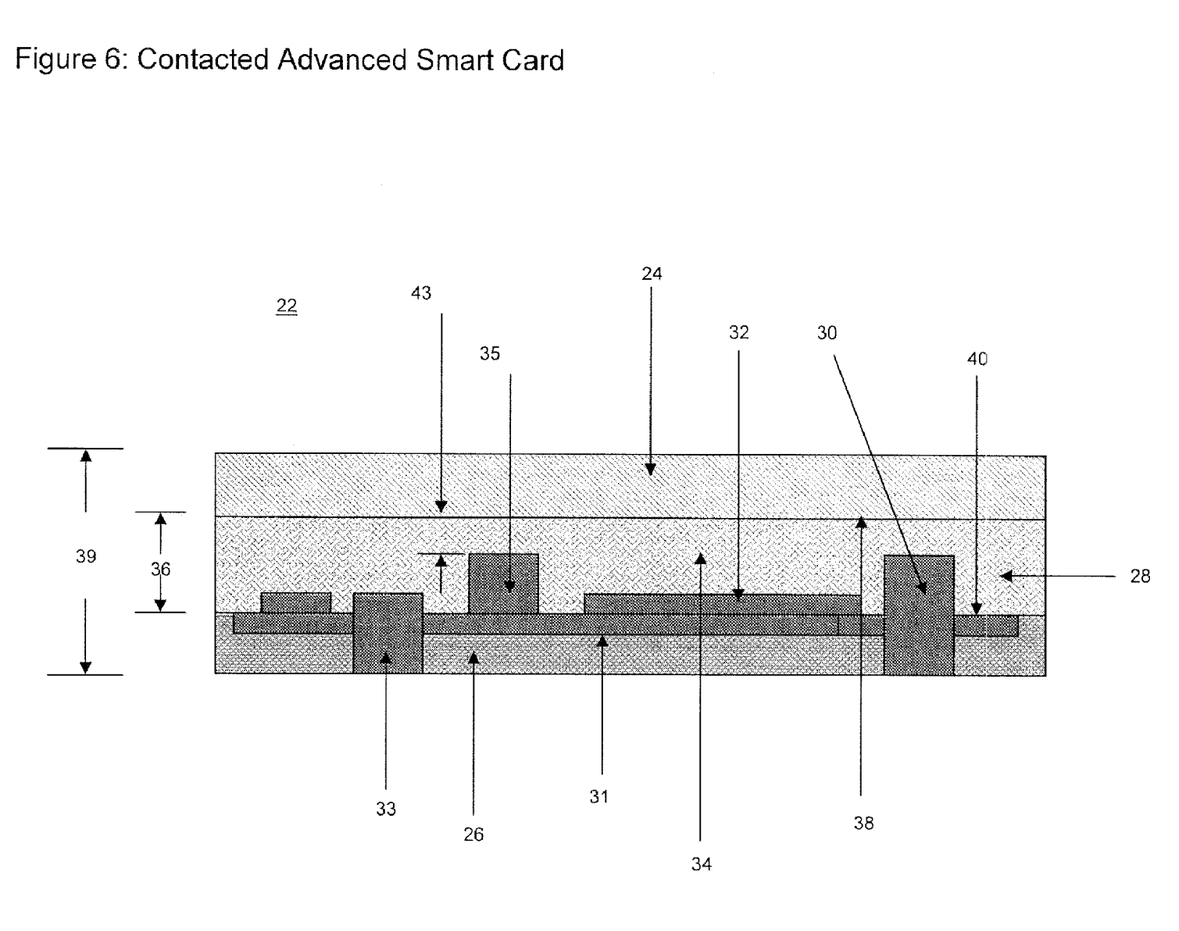
FIG. 6 illustrates a cut-away view of a Contacted Advanced Smart Card made according to the teachings of this patent disclosure.

FIG. 6 illustrates a completed contacted Advanced Smart Card made according to the teachings of this patent disclosure.

Figure 7:
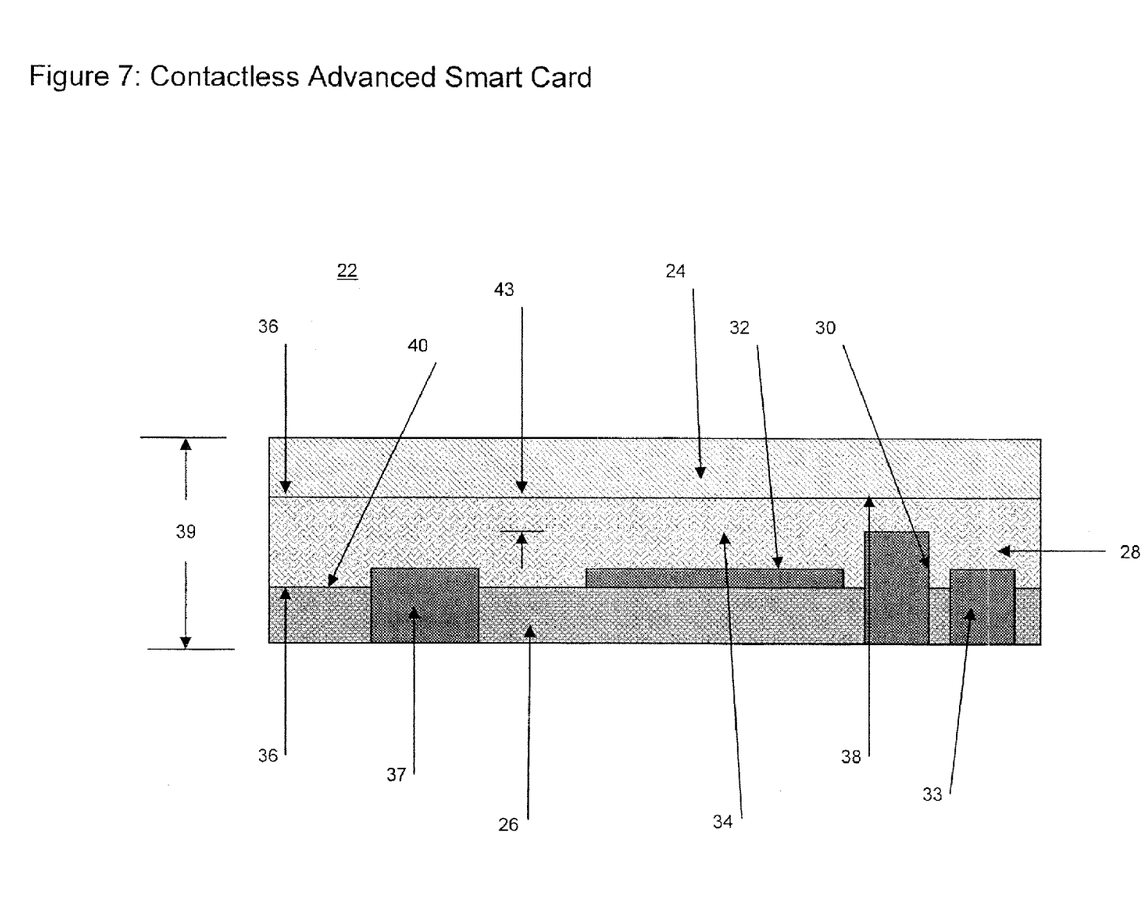
FIG. 7 illustrates a cut-away view of a Contactless Advanced Smart Card made according to the teachings of this patent disclosure.

FIG. 7 illustrates a completed contactless Advanced Smart Card made according to the teachings of this patent disclosure.

Figure 8:
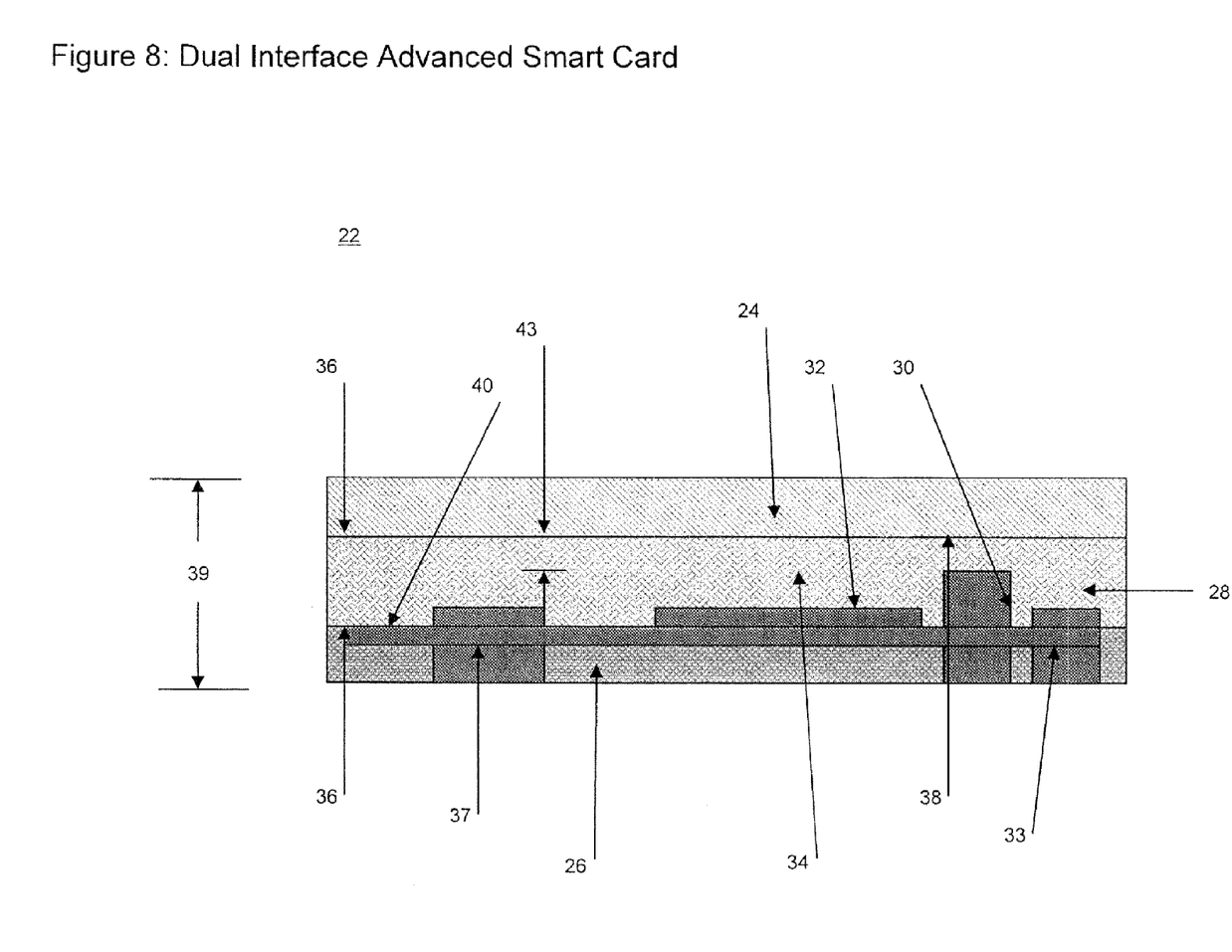
FIG. 8 illustrates a cut-away view of a Dual Interface Advanced Smart Card made according to the teachings of this patent disclosure.

FIG. 8 illustrates a dual interface Advanced Smart Card made according to the teachings of this patent disclosure.

Figure 9:
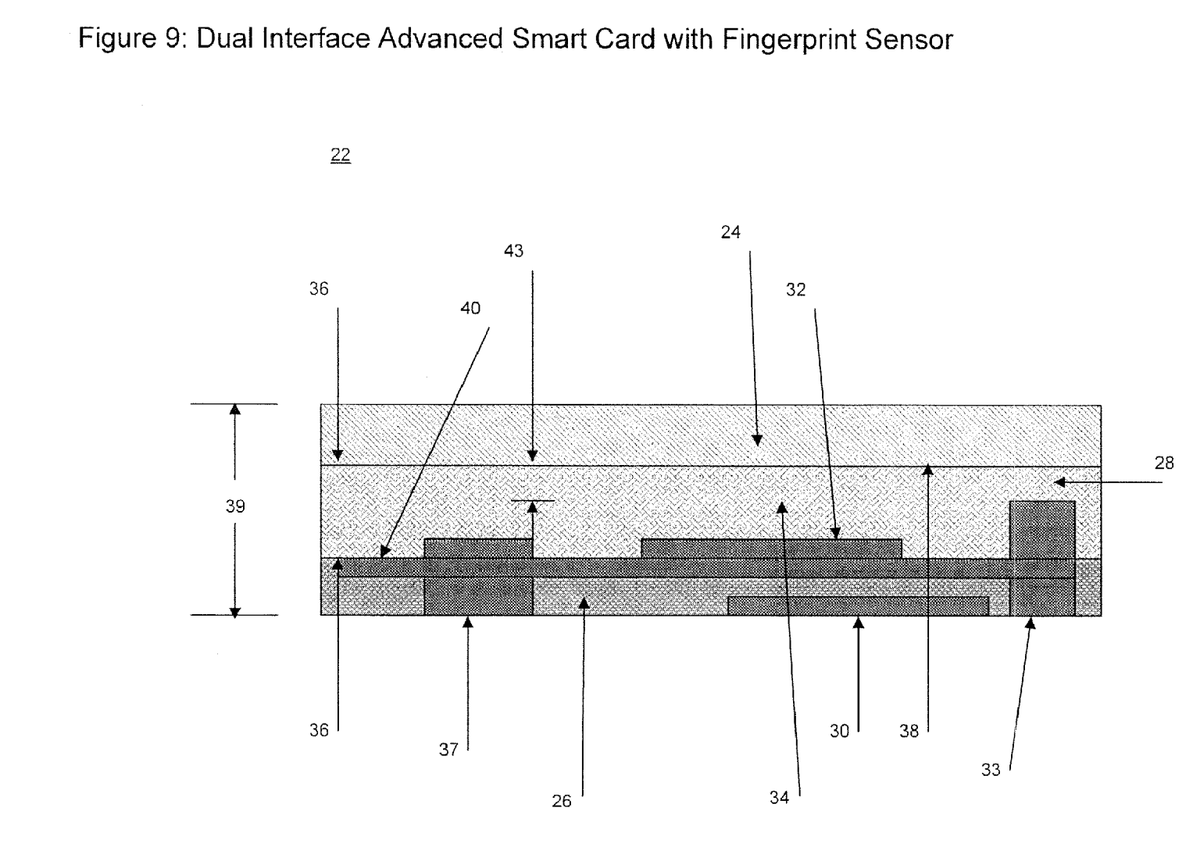
FIG. 9 illustrates a cut-away view of a Dual Interface Advanced Smart Card with a Fingerprint Sensor 30 made according to the teachings of this patent disclosure.

FIG. 9 illustrates a dual interface Advanced Smart Card with fingerprint sensor 30 made according to the teachings of this patent disclosure.

Figure 10:
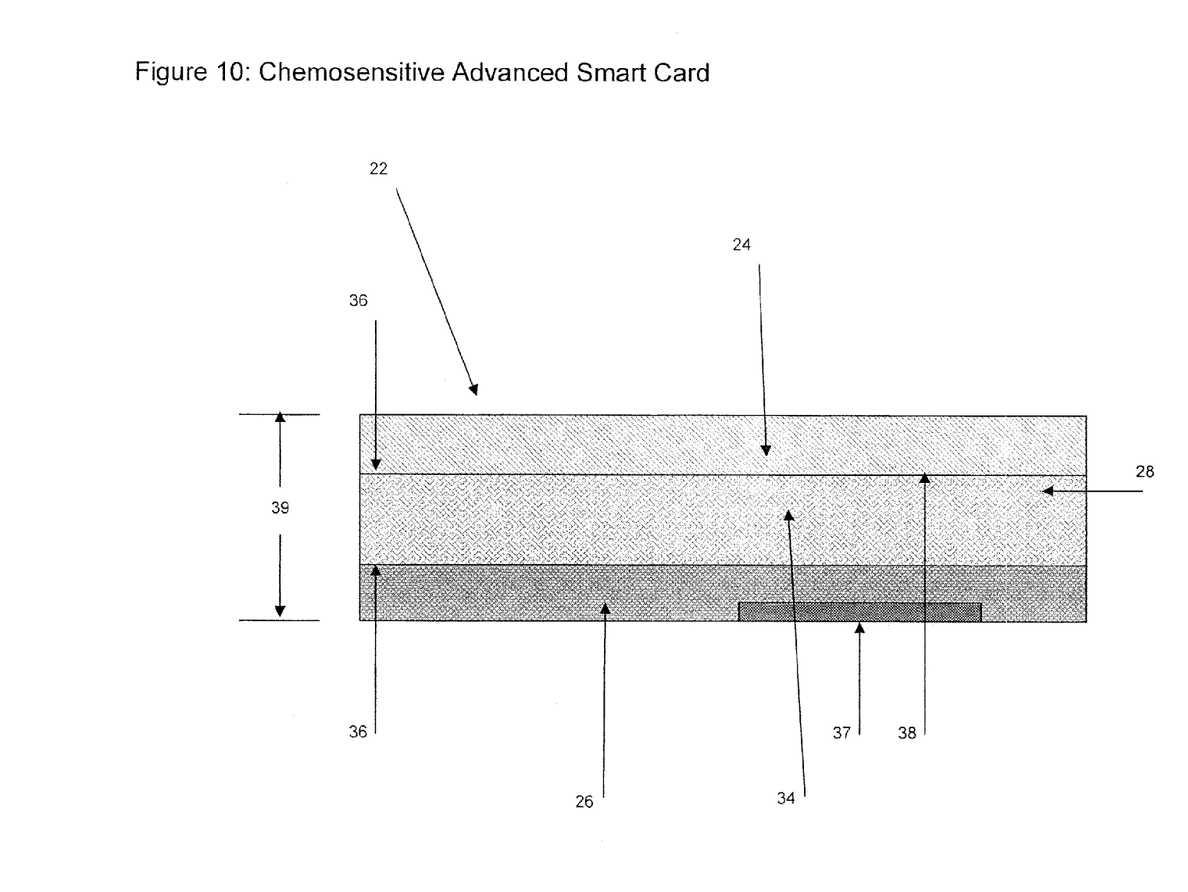
FIG. 10 illustrates a cut-away view of a Chemosensitive Advanced Smart Card with a Sensor Strip 37 that is chemically reactive and provides a visual signal when particular chemical substances or radiation has been detected. The heat-sensitive Sensory Strip is protected from high temperature deterioration by the low-temperature, low-pressure process used with the card manufacturing method in this disclosure.

FIG. 10 illustrates a chemosensitive Advanced Smart Card with a sensor strip 37 that is chemically reactive and provides a visual signal when particular chemical substances or radiation has been detected. The heat-sensitive sensor strip is protected from high-temperature deterioration by the low-temperature, low-pressure process used with the card manufacturing method in this disclosure.

Figure 11:
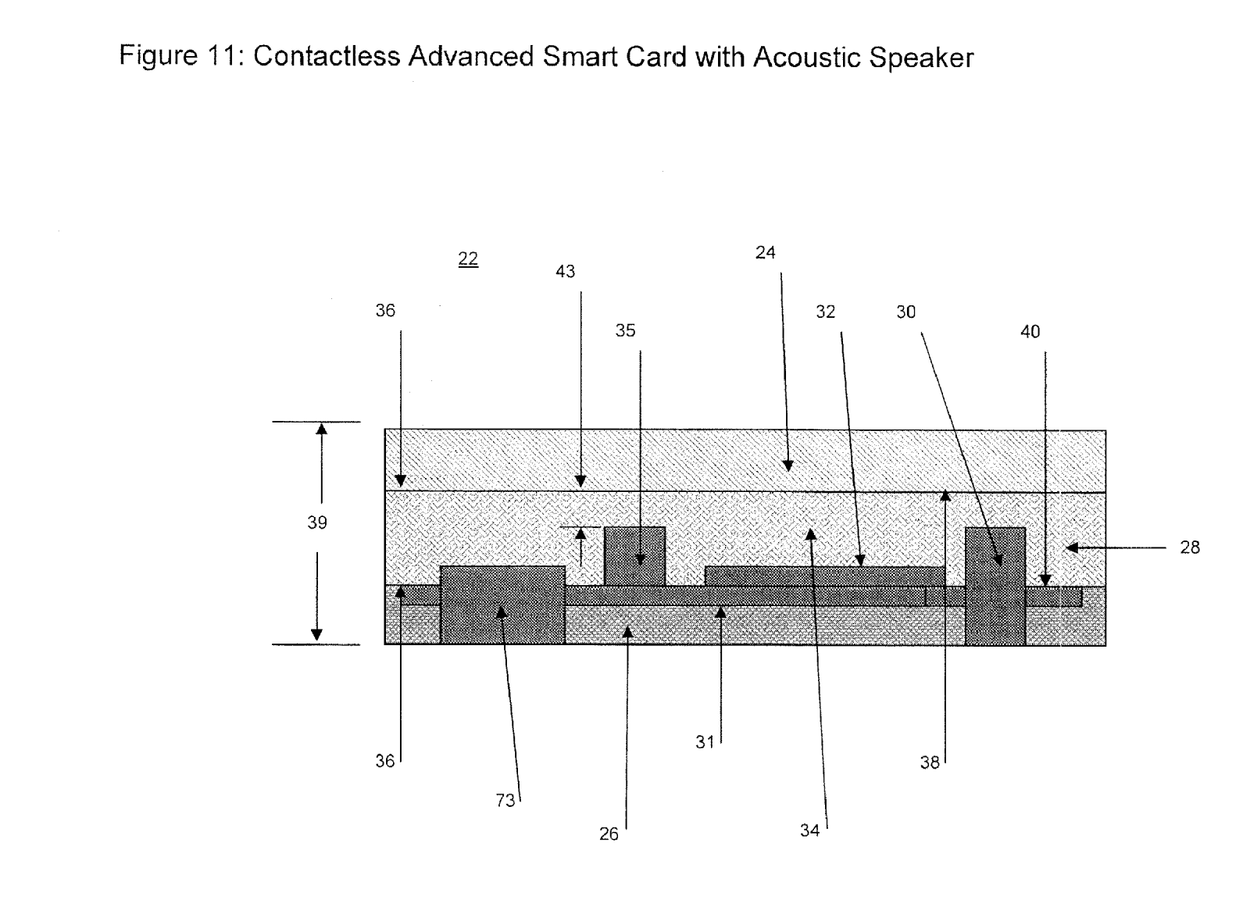
FIG. 11 illustrates a cut-away view of a Contactless Advanced Smart Card with an Acoustic Speaker 73 made according to the teachings of this patent disclosure.

FIG. 11 illustrates a contactless Advanced Smart Card with an acoustic speaker 73 made according to the teachings of this patent disclosure.

While this invention has been described with respect to various specific examples and a spirit that is committed to the concept of the use of special glues and gluing procedures, it is to be understood that the herein described invention should be limited in scope only by the following claims.

What is claimed is:

1. An advanced smart card comprising a top layer, a core layer of thermoset polymeric material, and a bottom layer comprising an integrated electronics assembly mounted on a substrate formed according to the following steps:
   (1) positioning a bottom layer comprising the integrated electronics assembly mounted on a substrate in a bottom mold;
   (2) positioning a top layer comprising synthetic paper or other plastic material in a top mold;
   (3) closing the top mold to the bottom mold in a manner that creates a void space between the top layer and the bottom layer comprising the integrated electronics assembly;
   (4) injecting a thermosetting polymeric material into the void space to form a core layer consisting of polymeric material, the injection taking place at a temperature and pressure which are such that:
      (a) the top layer of material is at least partially cold, low pressure molded into a cavity in the top mold;
      (b) gases and excess polymeric material are driven out of the void space;
      (c) the injected polymeric material flows over and around all exposed portions of the electronic components of the integrated electronic assembly positioned on the top surface of the bottom layer such that the bottom surface of the bottom layer remains free of the injected polymeric material and;
      (d) the thermosetting polymeric material bonds with both the top layer and the bottom layer to produce a unified precursor advanced smart card body;
   (5) removing the unified precursor advanced smart card body from the top and bottom molds; and
   (6) trimming the precursor advanced smart card to a desired dimension to produce a finished advanced smart card.

2. The advanced smart card of claim 1, wherein the integrated electronics assembly mounted on a substrate has maximum dimensions of 54 mm high, 85.6 mm long, and 0.50 mm thick.

3. The advanced smart card of claim 1, wherein the substrate is a printed circuit board.

4. The advanced smart card of claim 1 wherein the inside surface of the top layer and the inside surface of the bottom layer are treated to facilitate the creation of a strong bond between the top layer and the thermosetting material and the bottom layer and the thermosetting material.

5. The advanced smart card of claim 1 wherein the inside surface of the top layer and the inside surface of the bottom layer are treated by coating each with a bond promoting agent.

6. The advanced smart card of claim 1 wherein the inside surface of the top layer and the inside surface of the bottom layer are treated by a corona discharge process.

7. The advanced smart card of claim 1 wherein the thermosetting polymeric material is injected into the void space at a pressure less than 100 psi.

8. The advanced smart card of claim 1 wherein the thermosetting polymeric material is injected into the void space at a temperature less than 100° F.

9. The advanced smart card of claim 1 wherein the integrated electronics assembly includes electronic components selected from the following group: microprocessors, antennae, Integrated Circuit (IC) chips, batteries, Light Emitting Diodes (LED), Liquid Crystal Displays (LCD), polymer dome switches, acoustic speakers, and sensors (such as fingerprint sensors).

10. The advanced smart card of claim 1 wherein the top layer is formed from a flat sheet of polymeric material.

11. The advanced smart card of claim 1 wherein the top layer is preformed with at least one card-forming cavity.

12. The advanced smart card of claim 1 wherein the top layer is molded into an advanced smart card forming cavity of a top mold and the bottom layer is molded against a substantially flat surface of a bottom mold.

13. The advanced smart card according to claim 1 wherein an outside surface of the substrate upon which the electronics assembly is mounted forms an outer surface of the advanced smart card.

14. An advanced smart card comprising a top layer, a core layer of thermoset polymeric material, and a bottom layer comprising an integrated electronics assembly mounted on a substrate formed according to the following steps:
   (1) using an integrated electronics assembly mounted on a substrate, with maximum dimensions of 54 mm wide, 85.6 mm long, and 0.50 mm thick, and positioning the integrated electronics assembly mounted on a substrate in a bottom mold;
   (2) positioning a top layer comprising synthetic paper or other plastic material in a top mold;
   (3) closing the top mold to the bottom mold in a manner that creates a void space between the top layer and the bottom layer comprising the integrated electronics assembly;
   (4) injecting a thermosetting polymeric material into the void space to form a core layer consisting of polymeric material, the injection taking place at a temperature less than 150° F. and pressure less than 100 PSI which are such that:
      (a) the top layer of material is at least partially cold, low pressure molded into a cavity in the top mold;
      (b) gases and excess polymeric material are driven out of the void space;
      (c) the injected polymeric material flows over and around all exposed portions of the electronics components of the integrated electronics assembly positioned on the top surface of the bottom layer such that the bottom surface of the bottom layer remains free of the injected polymeric material; and
      (d) the thermosetting polymeric material bonds with both the top layer and the bottom layer to produce a unified precursor advanced smart card body;
   (5) removing the unified precursor advanced smart card body from the top and bottom molds; and
   (6) trimming the precursor advanced smart card to a desired dimension to produce a finished advanced smart card.

15. The advanced smart card according to claim 14 wherein an outside surface of the substrate upon which the electronics assembly is mounted forms an outer surface of the advanced smart card.

* * * * *